July 11, 1967     L. MARSHALL     3,330,124
PROCESS FOR REMOVAL OF WATER FROM LIGHT HYDROCARBON
FLUID MIXTURES BY DISTILLATION
Filed July 5, 1963
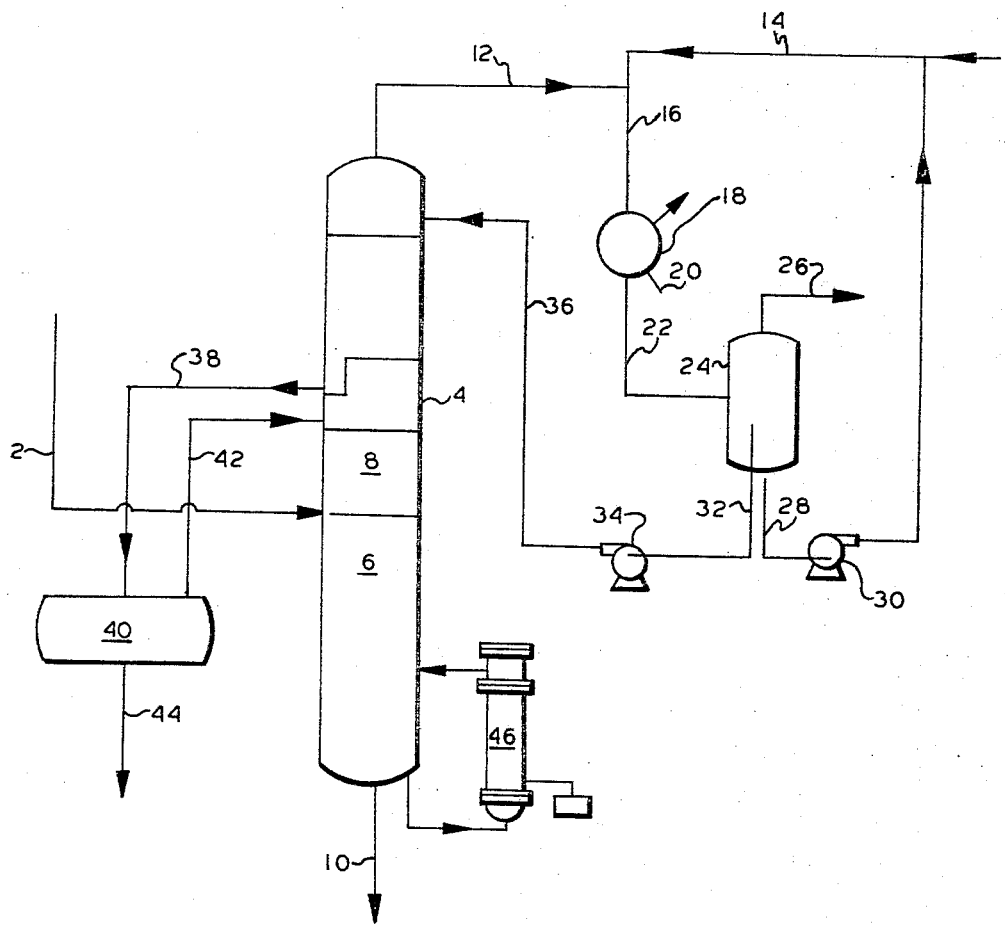
INVENTOR
LOUIS MARSHALL
BY *Ross L. Foertmeyer*
ATTORNEY

United States Patent Office 3,330,124
Patented July 11, 1967

3,330,124
PROCESS FOR REMOVAL OF WATER FROM LIGHT HYDROCARBON FLUID MIXTURES BY DISTILLATION
Louis Marshall, Great Neck, N.Y., assignor to The Lummus Company, New York, N.Y., a corporation of Delaware
Filed July 5, 1963, Ser. No. 293,100
8 Claims. (Cl. 62—20)

The present invention relates to the separation of hydrocarbon mixtures, and more particularly relates to an improved process for preventing ice or hydrate formation in a fractionating tower and for recovering the dehydrating agent used to prevent ice and hydrate formation.

In plants designed for the production of ethylene, the process scheme frequently includes a depropanizer which operates within a pressure range of from about 150 to about 200 p.s.i.g. Operating temperatures in the upper portion of the depropanizer above the point at which the feed is introduced, and in the reflux condenser, are normally below the freezing point of water. Generally, the depropanizer overhead is cooled with a refrigerant at a temperature in the range of from about —20° F. to about —40° F. in order to condense a portion of the overhead to provide the reflux requirements for the depropanizer. The particular operating conditions are chosen to avoid an excessively high temperature in the depropanizer reboiler, as the latter may become fouled with polymers formed by the polymerization of butadiene and other diolefins present in the hydrocarbon liquid streams being processed.

Some processes employ a solid desiccant to absorb water vapor from the feed to the fractionating tower. The use of a desiccant for this purpose has the disadvantage in that the desiccant has a short on-stream life as a result of rapid fouling of the desiccant caused by the adsorption of diolefins from the feed stream during the drying cycle, and the polymerization of these components during regeneration of the desiccant with hot gases. Various alternate methods of regeneration have been practiced to minimize fouling but, in general, desiccant costs for these methods remain relatively high.

An alternate method for preventing ice or hydrate formation is the injection of a methanol solution into the fractionator overhead or reflux. With methanol or other alcohols, such as glycol, for example, present in the condenser and in the fractionator, water vapor, which condenses, forms a solution with the alcohol and the freezing point of such alcohol solution is below the prevailing temperature of the fractionator. As previously practiced, the alcohol solution flows down the fractionator and a portion of the alcohol becomes partially dissolved or entrained in the fractionator bottoms, which consists of $C_4$ components and light gasoline fractions. The remaining portion of the alcohol is vaporized and is withdrawn in the overhead vapor product from the fractionator. The alcohol in the fractionator overhead and bottoms is not easily recoverable and, as the process is presently practiced, all the alcohol introduced into the fractionator or condenser is completely lost and represents a significant chemical cost in plants using such process.

In accordance with the present invention, a process is provided for separating the alcohol solution from the hydrocarbon liquid in order to permit the recovery and reconcentration of the alcohol solution. This process consists of introducing a concentrated alcohol solution into the fractionator and withdrawing from the fractionator the total liquid downflow at a point above the point at which the feed is introduced and where the operating temperature is above the freezing point of water, i.e., 32° F. The total liquid downflow is passed to a settling drum wherein the now dilute alcohol solution is separated from the hydrocarbon liquid. The hydrocarbon liquid is returned to the fractionator at a point below the point at which the total liquid downflow is withdrawn and above the point at which the feed is introduced. The alcohol solution is passed to a distillation unit consisting of a still in which water and absorbed hydrocarbons are removed. The reconcentrated alcohol solution is then returned to the fractionator for reuse.

Accordingly, of the alcohol flowing down the tower in the liquid phase, the only losses are the amounts which are soluble and entrained in the hydrocarbon liquid withdrawn from the settling drum. An important feature of the process of the present invention is that the hydrocarbon liquid withdrawn from the fractionator is primarily formed of $C_4$ and lighter hydrocarbons and is relatively free of $C_5$ and heavier hydrocarbons, since the point at which the total liquid downflow is removed is well above the point at which the feed is introduced into the fractionator. The solubility of alcohol, such as methanol or glycol for example, in $C_4$ and lighter hydrocarbons is considerably less than in heavier hydrocarbons, particularly benzene and other aromatics which are present in the fractionator feed. By withdrawing the alcohol from the fractionator before the solution can contact the fractionator feed, chemical losses are substantially reduced and the disadvantages associated with the use of a fractionator for this service are eliminated.

The absence of alcohol in those portions of the fractionator below the point at which the liquid downflow is withdrawn is no problem, since the point of liquid withdrawal is selected as one where the temperature is above the freezing point of water and the condensation of water cannot result in the formation of ice.

It is a primary object of my invention to provide an improved process for preventing ice or hydrate formation in a fractionating tower and the overhead condenser.

It is another object of my invention to provide an improved process for preventing ice or hydrate formation in a fractionating tower while simultaneously recovering substantially all of the dehydrating agent used to prevent such formation.

Other objects and a fuller understanding of the invention may be had by referring to the following description when taken in conjunction with the accompanying drawing, in which the figure is a schematic flow diagram of a preferred embodiment of my invention.

The hydrocarbon feed is introduced through line 2 into a reboiled fractionator 4, including a stripping section 6 below the point of introduction of the feed and a rectifying section, generally indicated as 8, and located above the point at which the feed is introduced into the fractionator 4. The fractionator bottoms are withdrawn from the fractionator 4 through line 10, while the fractionator overhead is withdrawn through line 12. The concentrated solution of an alcohol in line 14, such as methanol or a polyhydric alcohol, such as glycol, is introduced into the fractionator overhead in line 12. The combined stream in line 16 is thereupon passed through a reflux condenser 18, normally operated at a temperature below 32° F., and preferably at a temperature in the range of from about 0° F. to about −20° F. The reflux condenser 18 is maintained at a temperature within this range by the introduction of a refrigerant into the reflux condenser 18 through line 20 at a temperature in the range of from about −20° F. to about −40° F.

The thus cooled fractionator overhead is thereupon passed through line 22 into reflux drum 24. A gaseous overhead is withdrawn from the reflux drum 24 through line 26 and forms the product from the fractionator 4. The alcohol solution introduced into the fractionator overhead and the condensed hydrocarbons effect a phase separation in the reflux drum 24. An alcohol solution is withdrawn from the lower portion of the reflux drum 24 through line 28 and is passed by pump 30 to be combined with the alcohol solution in line 14 to provide good circulation across the condenser 18. Hydrocarbon liquid is withdrawn from reflux drum 24, together with an alcohol solution, through line 32 and is passed by pump 34 into fractionator 4 through line 36 at a temperature of about 0° F. The liquid hydrocarbon in line 36 constitutes the reflux requirements for the fractionator 4.

At a point in the fractionator 4 above the point at which the feed is introduced, and where the temperature in the fractionator 4 is above the freezing point of water, the total fractionator downflow is withdrawn through line 38 and passed to a settling drum 40. In settling drum 40, the now diluted alcohol solution is separated from the liquid hydrocarbon which is withdrawn from the settling drum 40 through line 42. The liquid hydrocarbon in line 42 is re-introduced into the fractionator 4 at a point immediately below the point at which the total fractionator downflow is withdrawn. The dilute alcohol solution in the settling drum 40 is withdrawn through line 44 and is passed to a distillation unit (not shown) wherein the dilute alcohol solution is concentrated and returned to the process by line 14.

The reboiled fractionator 4 is provided with a reboiler 46 and is operated in a manner well known to those skilled in the art.

Illustrative of a preferred embodiment of my invention, 3650 lb. moles per hour of a hydrocarbon feed having an analysis as set forth in Table I below, including 335 lbs. of $H_2O$ per hour were introduced into the fractionator 4. Net hydrocarbon streams produced are 515 lb. moles per hour as a bottoms product and 3135 lb. moles per hour as an overhead product, both having analyses as set forth in Table I below. 5850 lbs. per hour of a 74 wt. percent glycol solution were introduced into the fractionator 4 through line 36, together with the reflux requirements therefor. The total fractionator liquid downflow was withdrawn through line 38 and passed to the settling drum 40. 6200 lbs. per hour of a 70 wt. percent glycol solution and at a temperature of 40° F. were withdrawn through line 44 and passed to a distillation unit, while the hydrocarbon liquid was returned through line 42 to the fractionator 4.

TABLE I.—COMPOSITION OF FRACTIONATOR STREAMS (MOLE PERCENT)

| | Feed (line 2) | Overhead (line 26) | Bottoms (line 10) |
|---|---|---|---|
| $H_2$ | 8.8 | 10.6 | |
| $CH_4$ | 25.6 | 29.7 | |
| $C_2H_4$ | 25.0 | 29.1 | |
| $C_2H_6$ | 9.6 | 11.1 | |
| $C_3H_6$ | 15.6 | 18.0 | .7 |
| $C_3H_8$ | 1.2 | 1.4 | .1 |
| $C_4$s | 10.8 | .1 | 76.0 |
| $C_5$s | 2.3 | | 16.3 |
| $C_6$s | .8 | | 5.7 |
| $C_7$s | .2 | | .8 |
| $C_8$s | .1 | | .4 |
| Total | 100.0 | 100.0 | 100.0 |

The glycol solution was concentrated to a 74 wt. percent solution and returned through line 14 at a temperature of 104° F., and was combined with the fractionator overhead in line 14. The combined stream in line 16 was cooled during passage through condenser 18, and introduced into the reflux drum at a temperature of −9° F. and at a pressure of 150 p.s.i.g.

Accordingly, 335 lbs. per hour of water were removed from the hydrocarbon feed while minimizing glycol losses determinable by the solubility and entrainment of the glycol in the hydrocarbon stream leaving settling drum 40 and the amount required to saturate the vapor product. In order to provide good circulation across the condenser 18, 4,000 lbs. per hour of a 74 wt. percent glycol solution were withdrawn from the lower portion of the reflux drum and were passed via line 28 and combined with the concentrated glycol solution in line 14.

It is understood that alcohols other than methanol and glycol will be operative in the described process, and that any liquid dehydrating agent may be used, provided that a solution thereof is essentially insoluble in the hydrocarbon feed and does not deleteriously react with the feed.

While I have shown and described a preferred form of my invention, I am aware that variations may be made thereto and I, therefore, desire a broad interpretation of my invention within the scope of the disclosure herein and the following claims.

I claim:

1. A process for removing water from a fluid mixture containing light hydrocarbons, which comprises introducing said mixture into a fractionating zone, introducing a reflux into said zone at a point above the point at which the mixture is introduced, said reflux containing an alcohol, withdrawing the total liquid downflow from said zone at a point above the point at which the mixture is introduced and where the temperature in said zone is above the freezing point of water, separating an aqueous alcohol solution from said total liquid downflow, and returning the remaining portion thereof to said zone, withdrawing a gaseous overhead from said zone, introducing an alcohol into said overhead, condensing a portion of said overhead in a condensing zone, withdrawing an overhead product from said condensing zone, withdrawing an aqueous alcohol solution from said condensing zone and combining said withdrawn solution with said alcohol introduced into said overhead, and returning said condensed overhead to said fractionating zone as the reflux therefore.

2. A process as defined in claim 1 wherein the alcohol introduced into said fractionating zone is withdrawn from said condensing zone together with the condensed overhead constituting the reflux requirements for said fractionating zone.

3. A process for removing water from a fluid mixture containing light hydrocarbons, which comprises introducing said mixture into a fractional distillation zone, introducing an alcohol into said zone above the point at which said mixture is introduced into said zone, withdrawing a liquid downflow from said zone at a point above the point at which said mixture is introduced and where the temperature is above the freezing point of water, separating an aqueous alcohol solution from said liquid downflow and returning the remaining portion of the liquid downflow to said zone.

4. A process as defined in claim 3 wherein said hydrocarbons are returned to said zone at a point above the point at which the mixture is introduced.

5. A process as defined in claim 4 wherein said alcohol is methanol.

6. A process as defined in claim 4 wherein said alcohol is a polyhydric alcohol.

7. The process of claim 4 wherein the fluid mixture contains propane, propylene, $C_2$ and lighter hydrocarbons, and $C_4$ and heavier hydrocarbons.

8. A process for removing water from a fluid mixture containing light hydrocarbons, which comprises introducing said mixture into a fractionating zone, withdrawing an overhead from said zone, introducing an alcohol into said overhead, introducing a portion of the withdrawn overhead as a reflux for said zone, said reflux containing some alcohol, withdrawing a liquid stream from said zone at a point in said zone wherein the temperature is above the freezing point of water, said point being above the point where said mixture is introduced, separating an aqueous alcohol solution from said liquid stream and returning said liquid stream to said zone at a point above the point where said mixture is introduced.

References Cited

UNITED STATES PATENTS

| | | | |
|---|---|---|---|
| 2,151,248 | 3/1939 | Vaughan | 62—20 |
| 2,758,665 | 8/1956 | Francis | 260—676 |
| 2,956,411 | 10/1960 | Gilmore | 62—20 |
| 3,187,064 | 1/1965 | Wang et al. | 62—20 |
| 3,214,890 | 11/1965 | Sterrett | 55—88 |

OTHER REFERENCES

John M. Campbell: The Petroleum Engineer, September 1954, pages C–11 to C–17.

NORMAN YUDKOFF, *Primary Examiner.*

WILBUR L. BASCOMB, JR., *Examiner.*